(No Model.)
H. H. & C. H. HARNDEN.
DRAFT EQUALIZER.
No. 462,406. Patented Nov. 3, 1891.
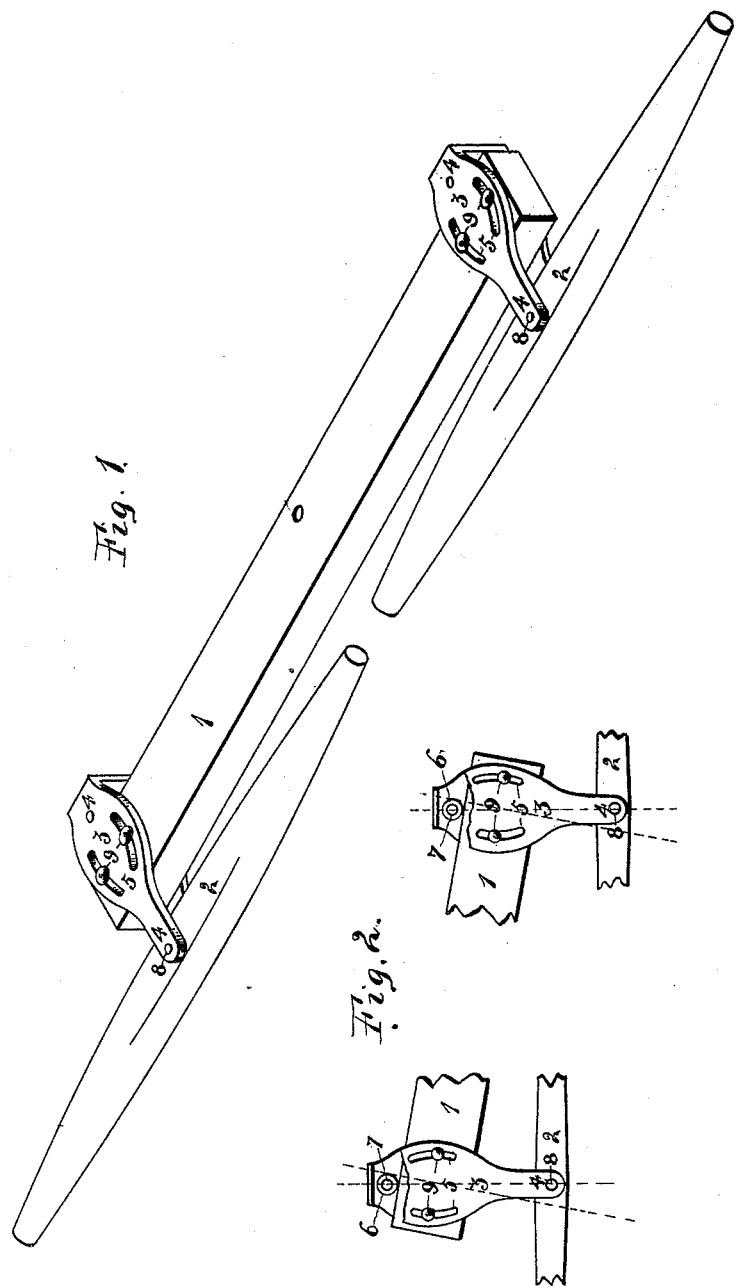
Witnesses:
E. Behel.
L. L. Miller.
Inventors:
Henry H. Harnden
Charles H. Harnden
By A. O. Behel.
Attys.

UNITED STATES PATENT OFFICE.

HENRY H. HARNDEN AND CHARLES H. HARNDEN, OF MERRIMAN, NEBRASKA.

DRAFT-EQUALIZER.

SPECIFICATION forming part of Letters Patent No. 462,406, dated November 3, 1891.

Application filed June 11, 1891. Serial No. 395,965. (No model.)

*To all whom it may concern:*

Be it known that we, HENRY H. HARNDEN and CHARLES H. HARNDEN, citizens of the United States, residing at Merriman, county of Cherry, and State of Nebraska, have invented certain new and useful Improvements in Draft-Equalizers, of which the following is a specification.

The object of our improved draft-equalizer is to automatically give to the horse of a team that shall lag behind the other an advantage in the leverage on the doubletree, and consequently a lighter load than the horse which pulls ahead of him.

In the accompanying drawings, Figure 1 is an isometrical representation of a doubletree and set of singletrees to which are attached our equalizing-clevis. Fig. 2 is a plan view of the clevis in the relative positions they assume when the doubletree is inclined from a position at right angles to the tongue.

In the construction of our draft-equalizer we employ the ordinary doubletree 1 and singletrees 2. The doubletree is secured to the wagon-tongue in the usual manner. The clevis proper, which is a connection between the singletree and doubletree, is composed of two similar plates 3, each perforated with two holes 4, and provided with two curved slots 5. These plates are placed one above and the other below the doubletree near its ends and stand with their length at right angles to the doubletrees. The length of the plates is somewhat greater than the width of the doubletree. Between the rear ends of the plates is pivoted a roller 6, which bears against the rear face of the doubletree, and a bolt 7 forms the bearing of the roller. A bolt 8 passes between the forward ends of the plates and forms a pivot for connecting the whiffletree to the doubletree. Two pins 9, passing through holes in the doubletree near its longitudinal center and extending somewhat beyond its faces above and below, enter the curved slots in the plates and hold the clevis on the doubletree.

The doubletree has a connection with the tongue of a wagon or other load in the usual manner. The pull when both horses draw evenly will be exerted on the doubletree at the point of contact of the roller in the rear of the clevis, and this will continue to be the case until one horse shall fall behind the other, when the doubletree turning on its pivot on the tongue of the wagon (the clevis, however, remaining straight with the line of draft) moves the clevis in its connection with the doubletree through the medium of the curved slots and pins. This movement changes the roller engagement with the rear side of the doubletree—that is, the point on the doubletree, where the roller engages it, of the front horse will be nearer the pivot of the doubletree with the tongue, and the roller of the clevis which has a connection with the singletree of the horse that is behind will be a greater distance from the pivot of the doubletree with the tongue. By this arrangement it will be seen that while horses draw evenly the rollers will be the same distance from the pivot of the doubletree with the tongue; but when one horse lags behind its leverage will be increased and the leverage of the forward horse will be decreased. This change of leverage will be gradual as one horse begins to lag behind, and as soon as both horses draw evenly the leverage will be equal. The slots in the plates and the pins in the doubletree serve to hold the clevis carrying the rollers in proper relation with the doubletree.

We claim as our invention—

A draft-equalizer composed of a doubletree and singletrees, two holes near each end of the doubletree in line with its length, a hole located rearwardly of its longitudinal center, pins for the first-mentioned holes, clevises for connecting the doubletree and singletrees, said clevis composed of one piece of metal having parallel upper and lower extensions joined at their rear ends, coinciding curved slots in both plates of each clevis through which the pins of the doubletree extend, a roller journaled between the plates in the rear end of the clevis, coinciding holes in the two plates in the forward end of the clevis, and a bolt passing through the holes upon which the singletree is pivoted.

HENRY H. HARNDEN.
CHARLES H. HARNDEN.

Witnesses:
ELLIS VILKIN,
ETHEL WILSON.